United States Patent [19]

Baguet

[11] 4,432,164

[45] Feb. 21, 1984

[54] DEVICE FOR CONTROLLING THE OPENING AND CLOSING OF FLUIDTIGHT DOORS

[75] Inventor: Paul R. Baguet, Le Taillan, France

[73] Assignee: S.A.R.L. Commodore International, Blanquefort, France

[21] Appl. No.: 390,654

[22] Filed: Jun. 21, 1982

[30] Foreign Application Priority Data

Jun. 25, 1981 [EP] European Pat. Off. .......... 81450008

[51] Int. Cl.³ .............................................. E05D 15/10
[52] U.S. Cl. ......................................... 49/209; 49/210
[58] Field of Search .......................... 49/209, 210, 213; 422/295

[56] References Cited

U.S. PATENT DOCUMENTS

| 3,224,382 | 12/1965 | Floehr | 49/209 X |
| 3,632,303 | 1/1972 | Albner | 49/209 X |
| 3,694,960 | 10/1972 | Miraldi | 49/210 X |
| 4,365,726 | 12/1982 | Broderick | 49/210 X |

FOREIGN PATENT DOCUMENTS 1217241 5/1966 Fed. Rep. of Germany .
398471 1/1909 France .
79051 9/1962 France .
1584576 12/1969 France .

Primary Examiner—Philip C. Kannan
Attorney, Agent, or Firm—Schwartz, Jeffery, Schwaab, Mack, Blumenthal & Koch

[57] ABSTRACT

A door closing device for an autoclave or the like is disclosed. Planar slides are provided on the door in planes parallel and perpendicular to the access opening plane. The slides have first guideways and are displaceable in their planes parallel to the access opening plane. Lateral guide members to opposite sides of the door are freely displaceable in the first guideways. Second guideways are formed in two wall members fixed to the frame, facing and parallel to the slides. The first and second guideways have paths determined to constrain movement of the guide members and the door so that for engagement and disengagement with the access opening edge the door is displaceable at right angles to the access opening and when the door is at a distance from the access opening edge it is displaceable by translation parallel to the access opening plane.

8 Claims, 4 Drawing Figures

DEVICE FOR CONTROLLING THE OPENING AND CLOSING OF FLUIDTIGHT DOORS

BACKGROUND OF THE INVENTION

The present invention relates generally to devices for controlling the opening and closing of fluidtight doors in contact with different pressures on its opposite sides.

The invention will be described more particularly for use for controlling autoclave doors, but it will be understood that the device according to the invention may be used with any chamber which is subjected to an internal or external pressure which may or may not be high and equipped with an access opening closed by a door which hermetically withstands internal or external pressures when the chamber is in operation, and more specially to any door, air lock or the like, between two zones subjected to different pressures wherein excellent fluidtightness must be provided.

In the field of autoclaves various systems for closing doors are known.

In one of these systems a series of levers are disposed substantially radially on the outer side of the door (which in general is of circular contour). The radially outer ends of the levers are displaceable radially of the door and perpendicular to the plane thereof in order to bear against a collar fixed to the frame of the autoclave surrounding the access opening and adapted to lock the door of the autoclave in its closed fluidtight position.

The other ends of the levers are controlled simultaneously by a movable annular member by means of a handwheel, both in rotation and translation perpendicular to the plane of the door.

This system is complicated and expensive to make because the levers and the control device must be precision machined owing to the movements of the levers in three dimensions if perfect fluidtightness and high pressure resistance are desired, which means the bearing ends of all the levers being displaced strictly synchronously and simultaneously bearing on the locking collar.

Further, this system may be dangerous in case of accidental opening of the door since once the levers free themselves from the locking collar nothing retains the door, which may open violently under internal pressure causing accidents.

In a second known system lateral translation of the door is employed. The door in its closed position is held captive in slides fixed to the frame of the autoclave and urged against these slides by means of an inflatable seal housed in a groove formed around the access opening. This system is even more complex than the preceeding one since it requires pressurized fluid supply in the groove in which the inflatable seal is housed and utilizes a complete control system for operating this seal in the course of opening and closing the door.

Such a device is therefore expensive. It is also delicate and less reliable than the preceeding one. Further the seal employed is a special expensive seal and it must be replaced regularly as it wears and may be deformed or damaged in the course of inflation and deflation in the housing in order to bear flush against the door (when closed) and to retract or collapse in the groove (when open).

OBJECT AND SUMMARY OF THE INVENTION

An object of the invention is to provide a device for controlling the opening and closing of a door such as that of an autoclave, which compared to known devices is of simpler design, lower construction and maintenance cost, more reliable and capable, in case of accidental opening of the door when the interior is at overpressure relative to the surroundings, of avoiding any accidents.

According to the invention there is provided a device for controlling the opening and closing of a pressure-resistant door mounted on a frame for translation relative to the plane of the associated access opening. The door controlling device comprises planar slides provided on the door and disposed in planes parallel and perpendicular to the access opening plane. The slides have guideways defined by slots and are displaceable by translation in their planes parallel to the access opening plane. Means control the displacement of the slides. Lateral guide members in parallel spaced relations to opposite sides of the door are freely displaceable in the first guideways. Second guideways are configured to receive the lateral guide members and are formed in two wall members fixed to the frame, facing and parallel to the slides. The first and second guideways have paths determined to constrain the movement of the guide members and thereby the panel of the door during displacement of the slides, such that for engagement or disengagement with the edge defining the access opening the door panel is displaceable at right angles to the access opening and, at a distance from the access opening edge, the door panel is displaceable by translation parallel to the access opening plane.

According to an embodiment of the door controlling device each of the first guideways comprises a first rectilinear part at right angles to the access opening plane and a second rectilinear part slightly inclined with respect to the longitudinal axis of the associated slide for effecting compression of the sealing member interposed between the door panel and the access opening edge, through the door panel. The second guideways on each side of the door comprise first rectilinear portions parallel to the access opening plane and common with the second guideways on the same side of the door and aligned with the end of the first part of the first guideways. The second guideways further comprise second rectilinear portions at right angles to the access opening. Each of the second rectilinear portions has an end in alignment with the end of the second part of first guideways and an angled intermediate rectilinear portion facilitating the transition between the displacement of the door at right angles to the access opening plane and the displacement of the door parallel to the access opening plane.

Advantageously, the slides slide in wall members fixed to the frame and are interconnected by a plurality of cross members adapted to be in contact with bearing members fixed to the door once the door panel is in contact with the edge of the access opening, the first guideways comprising a first rectilinear part parallel to the plane of the access opening and extending the second part of the first guideways.

Preferably, the side of the first rectilinear part extending the first guideways which receives the reaction thrust of the door, has a slight recess so that the thrust is transmitted to the frame through the bearing members and cross members.

The sliding of the slides in their guides is provided, for example, by gear racks fixed to the slides and meshing with pinions driven by a manually operated mechanism or a motor-powered mechanism disposed laterally of the door.

Moreover, the sealing member is preferably a gasket received astraddle the edge of the wall of the chamber defining the access opening so that the door panel is exposed, such a gasket being inexpensive and easy to replace while providing excellent fluidtightness over a remarkably long period of service owing to the manner in which the door panel comes into contact with and moves away from the seal.

The system is very safe whatever the position of the door, from the completely closed position, the pressure exerted on the door being totally transmitted to the frame in a uniform manner.

BRIEF DESCRIPTION OF THE DRAWINGS

These and other features and advantages of the invention will be brought out in the description which follows of an embodiment of the invention, which description is given strictly by way of example with reference to the accompanying drawings.

Figure 1:
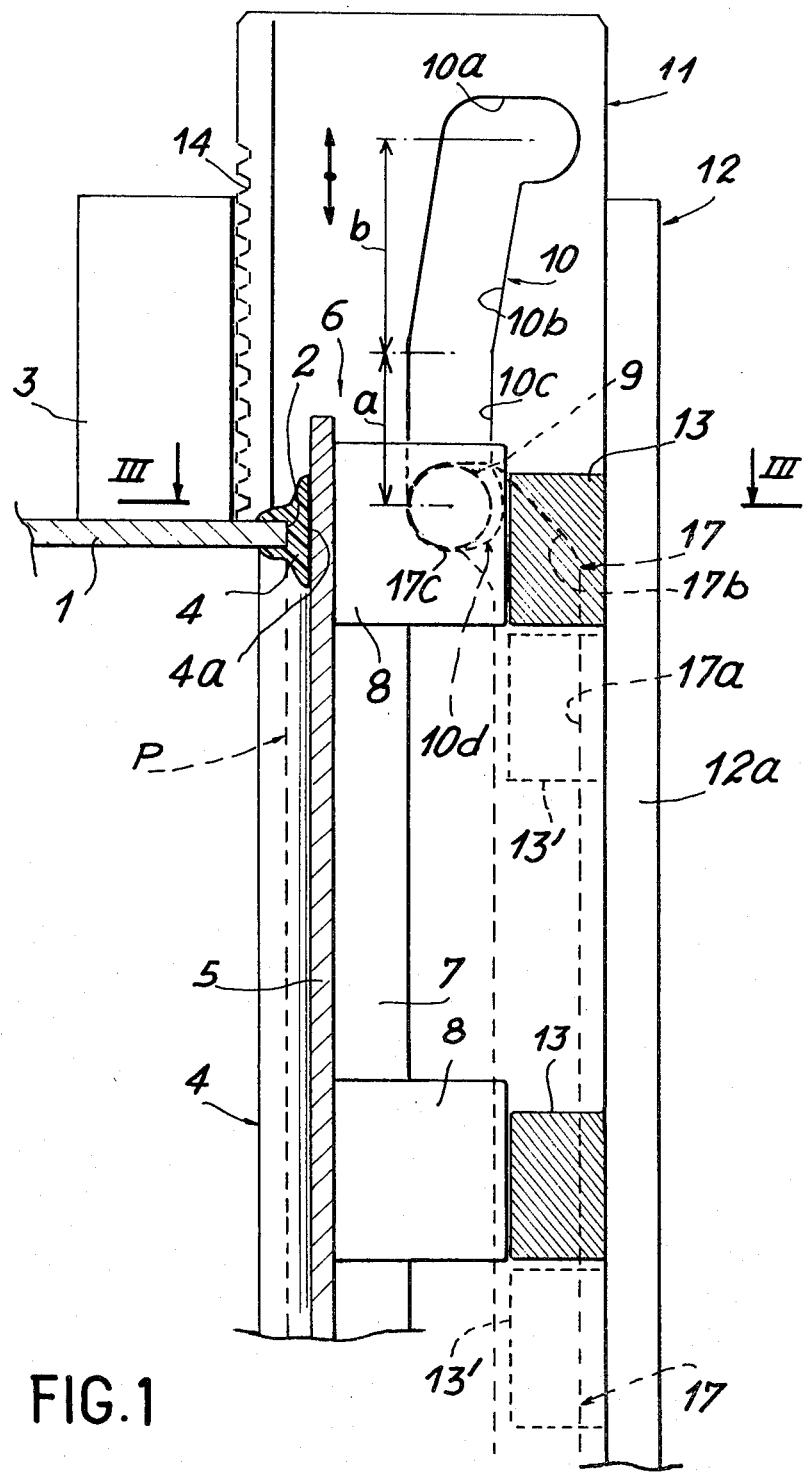
FIG. 1 shows a partial vertical sectional view of the upper part of the door controlling device embodying the invention.

Reference character 1 in the drawings designates the inner wall of an autoclave and more particularly the end of the inner wall having an edge 2 which defines the access opening of the autoclave, the plane P of the access opening being at right angles to the inner wall 1. The contour of the access opening may be rectangular, square or circular. For the sake of the description it is assumed to be rectangular.

The inner wall 1 is supported by a frame partially shown at 3. A seal or gasket 4 is received astraddle the edge 2 of the inner wall 1 thereby forming a continuous bead having a planar face 4a parallel to plane P of the access opening and facing the panel 5 of the door 6 of the autoclave.

The panel 5 of the door 6 is provided on the side opposite the joint with two parallel longitudinal members 7 disposed in the illustrated embodiment vertically along two opposite edges of the door. Each longitudinal member 7 comprises two thicker portions defining bearing blocks disposed at spaced locations along the longitudinal members 7. The endmost bearing blocks 8 are provided with outwardly extending lateral guide members comprised, for example, by rollers 9 freely mounted on ball or needle bearings. Each roller 9 is displaceable in a first guideway comprising a slot 10 formed in a planar plate 11 defining a slide. Thus two parallel vertical slides 11 are provided to opposite sides of the door 6. The slides 11, in turn, slide in trough-like housings in wall members 12 fixed to the frame 3 of the autoclave, thereby holding the slides 11 and the door 6 captive.

Figure 2:
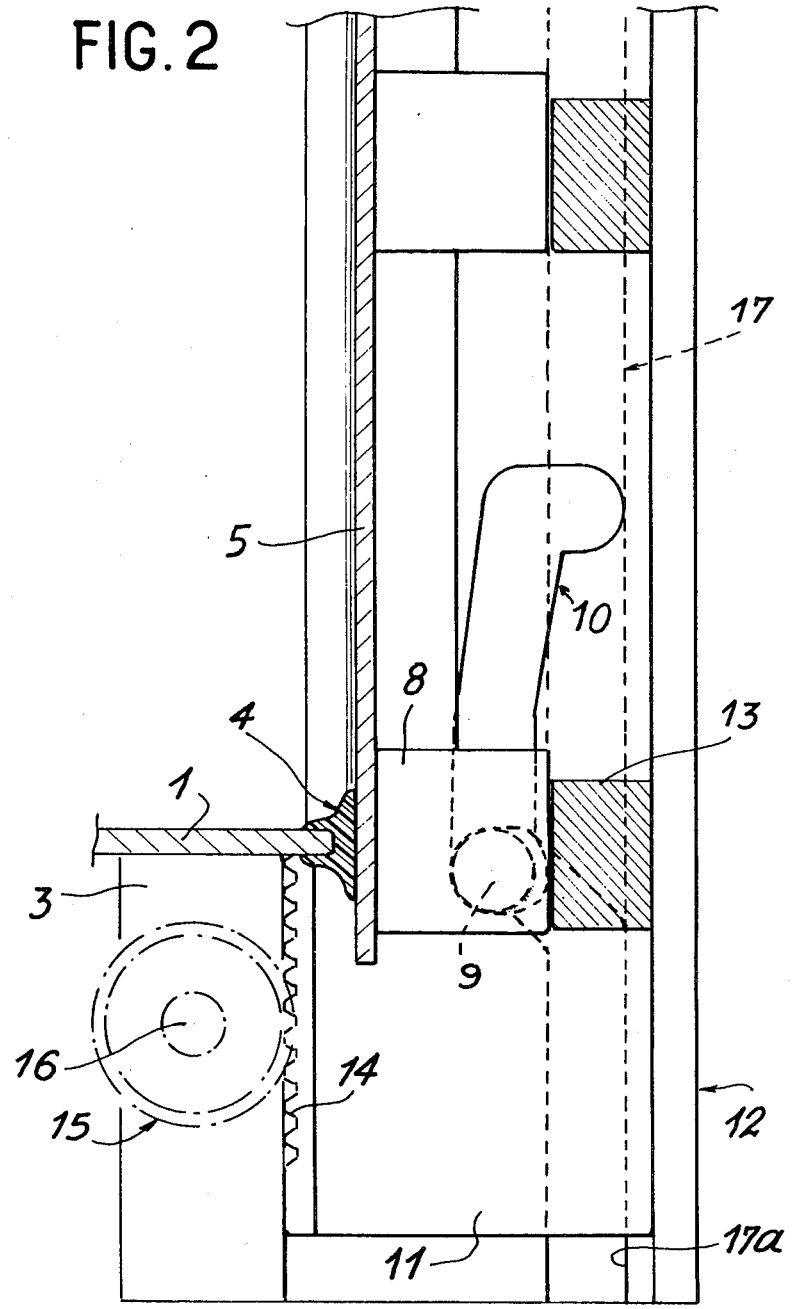
FIG. 2 shows a partial vertical sectional view of the lower part of the door controlling device.

The slides 11 are interconnected by parallel horizontal cross members 13. On the sides of the slides 11 facing the autoclave are carried gear racks 14 in mesh with pinions 15 journaled on the frame 3 at the lower part of the door controlling device (FIG. 2). The control shaft, schematically represented at 16, simultaneously controls the two gears 15 on opposite sides of the door 6, the control shaft 16 being manually operated by means of a hand wheel or a crank, or motor-powered by means of a suitable reduction gear means.

The rollers 9 extend beyond the slots 10 in the slides 11 and are displaceable in second guideways 17 formed in the inner face of the wall members 12.

The paths of the guideways 10 and 17 are such that they constrain the rollers 9 and thereby the panel 5 of the door 6 to translate along a path of movement comprising three movements which will be explained below.

To this end, each of the first guideways 10 comprises a first rectilinear part 10a perpendicular to the direction of displacement of the slides 11. The first rectilinear part 10a is extended by a second rectilinear part 10b slightly angled relative to the vertical direction of displacement of the slides 11. The second rectilinear part 10b is, in turn, extended downwardly by a third rectilinear part 10c parallel to the direction of displacement of the slides 11. The two second guideways 17 in wall member 12 comprises a common portion 17a running vertically along nearly the entire height of the wall member 12 and more specifically from the lower end (FIG. 2) to the edge of the access opening (FIG. 1). Common portion 17a is continued at its upper end by a rectilinear portion 17b angled at about 45° toward the autoclave, which in turn is continued by a horizontal rectilinear portion 17c extending toward the autoclave.

The operation of the door control device illustrated and described above will now be described.

Figure 3:
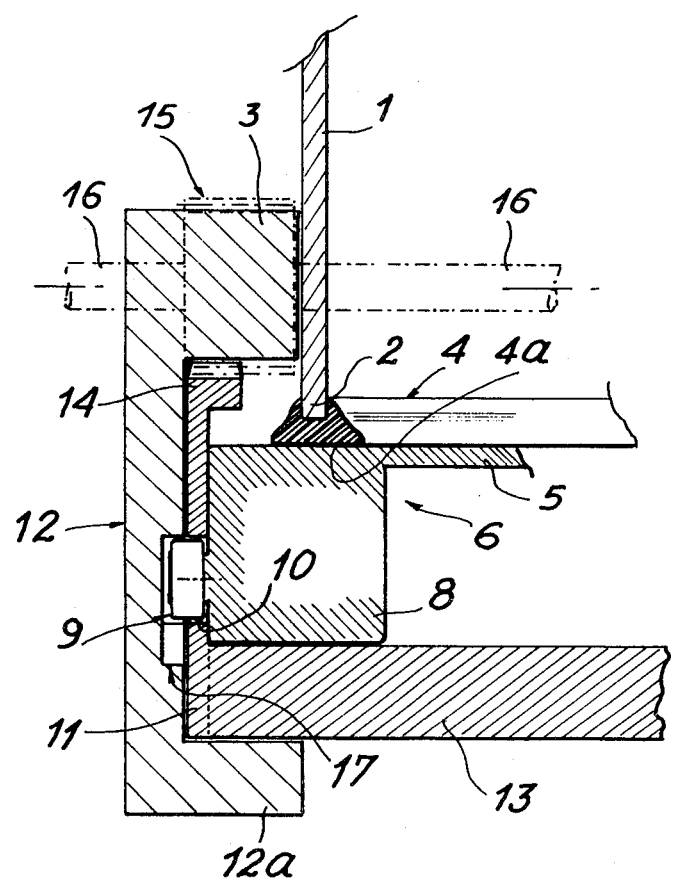
FIG. 3 shows a partial horizontal sectional view taken on line III—III of the door controlling device of FIG. 1.

We shall start with the closed position of the door 6 shown in FIGS. 1 and 2. In this position the door panel 5 is parallel to the plane P of the access opening of the autoclave and compresses the seal or gasket 4 under a certain amount of pressure. The cross members 13 of the movable slides 11 are in line with the bearing blocks 8. The bearing blocks 8 thus bear against the cross members 13 which transmit the pressure exerted on the door panel 5 to the frame 3 of the autoclave through the inturned portions 12a of wall members 12 (FIG. 3). This transmission of forces to the frame at a plurality of spaced points along the periphery of the door 6 provides the device with excellent mechanical resistance to pressures developed inside the autoclave.

To open the door the gears 15 are rotated manually or motor-powered to lower the two slides 11 simultaneously. At the end of the initial displacement a of the slides 11 the cross members 13 are at 13′, totally free and clear of the bearing blocks 8. The bearing blocks 8 have not in the meantime moved since the rollers 9 are retained vertically by the sides of the guideway portions 17c. To facilitate mutual sliding of facing parts 8 and 13 it is advantageous to provide at the lower ends of the guideway parts 10c (to the side of the cross members 13) a slight recess 10d (exaggerated in FIG. 4 for the sake of clarity). When the rollers 9 come into alignment with the recesses 10d, the seal or gasket 4, compressed by the door panel 5, urges the rollers to the bottom of the recesses. The depth of the recesses is determined so that at the bottom of the recesses the bearing blocks 8 are actually in contact with the cross members 13 and this contact is not made when the rollers 9 are not in the recesses 10d.

Therefore, at the end of the initial displacement a, the entire door 6 may then move away from the access opening. This occurs during the second phase of the displacement b of the slides 11. At the end of the guideway parts 10c the rollers 9 enter guideway parts 10b which constrain them for displacement in the guideway portions 17c.

The door panel 5 then translates at right angles to the plane P. This displacement of the door panel 5 is not very great but sufficient to decompress the seal or gasket 4 and move the door panel 5 out of engagement with the same.

No shearing or torsional action on the seal or gasket 4 is to be feared.

Figure 4:
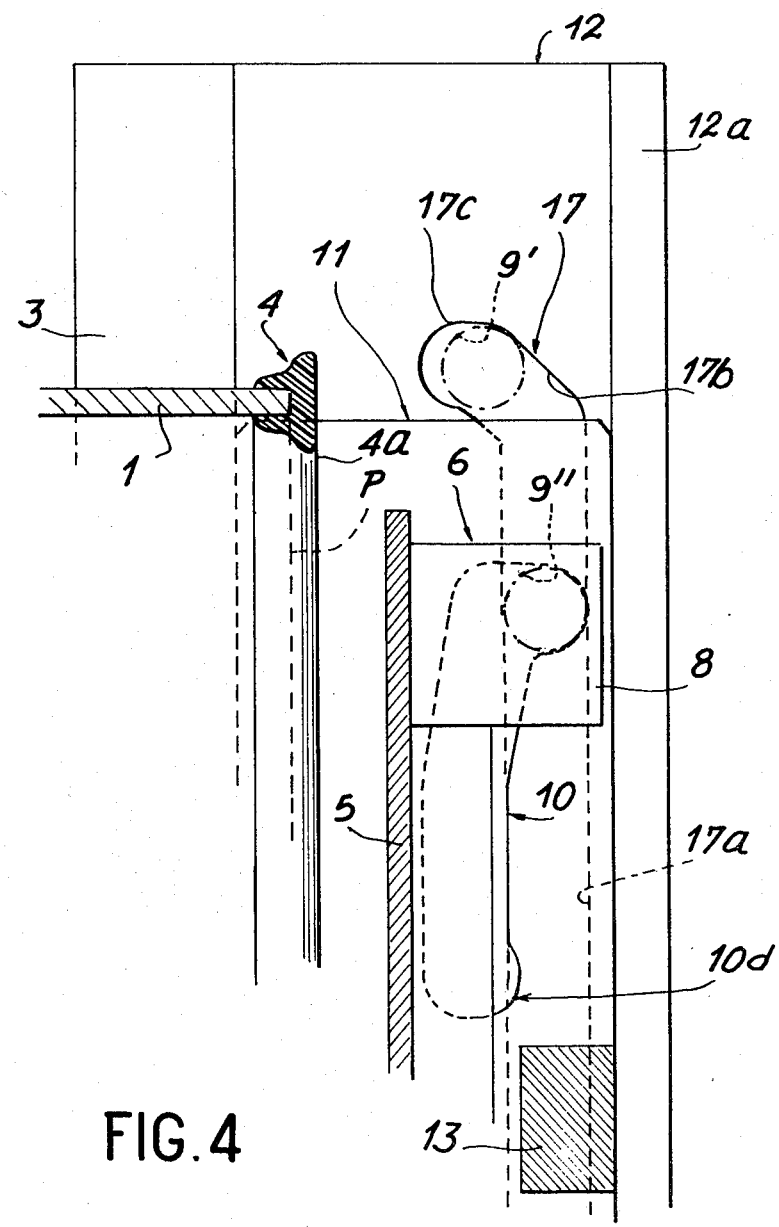
FIG. 4 shows an intermediate position of the door controlling device of FIG. 1.

At the end of the second phase of movement b the rollers 9 are in the position represented by dashed lines 9' in FIG. 4, the rollers then being at the right ends (as viewed in FIG. 4) of the guideway portions 17c and the upper ends of the guideway parts 10b.

The further downward movement of the slides 11 causes the rollers 9 to move along the guideway parts 10a and guideway portions 17b, the entire door 6 then being translated obliquely but parallel to the plane P of the access opening. At the end of the oblique translation the door 6 is at its maximum distance from the access opening (see FIG. 4). The downward movement of the slides 11 continues the rollers (at 9" in FIG. 4) descend the guideway portions 17a while being retained by the lower edges of the guideway parts 10a.

The door 6 may then give total access to the autoclave, the two lower rollers 9 exiting the guideway portions 17a open at their lower ends (see FIG. 2).

The door is constantly guided by the fixed members 12 during its opening and even when it is completely open.

The closing of the door 6 is carried out by the opposite operation along a pathway strictly the reverse of the closure pathway owing to the cooperation of the guideways 10 and 17 constraining the rollers 9 to move upwardly in the guideway portions 17a, 17b and then 17c.

It is to be noted that at all points along this pathway the door 6 may be held stationary by stopping the torque applied to the gears 15, the rollers 9 being constantly maintained suspended by one of the guideways 10,17.

From the safety standpoint it is important to observe that in case of accidental opening of the door 6, with the autoclave still under high pressure, the operator does not risks having the door blown off toward him since it is constantly retained by the inturned portions 12a of wall members 12 fixed to the frame 3, nor being sprayed with steam or other matter when the door panel 5 moves out of contact with the seal 4, since the door panel 5 acts as a shield and the steam is exhausted laterally.

Obviously the door controlling device may be employed for the access opening of an autoclave or any kind of chamber adapted to withstand high internal pressures, of a structure different from that illustrated in the drawings and/or with a different type of seal or gasket. Similarly the access opening may not be planar in which case the door panel would be suitably curved.

Generally speaking, the invention is applicable to a door, air lock or the like giving access to a chamber or zone adapted to be subjected to a pressure substantially greater or less than that on the other side of the door or the like.

Furthermore, the invention is not intended to be limited to the illustrated and described embodiment but on the contrary encompasses all variations and alternatives understood to those skilled in the art, namely as regards the configuration of the cooperable guideways 10 and 17 as well as the means for controlling the displacement of the slides 11.

Also, the direction of sliding of slides 11 may be in any vertical, horizontal or oblique plane and in such plane along a variable orientation as a function of the configuration and the arrangement of the access opening to be sealed off and the position thereof.

Finally, it is also possible to provide lateral opening of the door panel 5, that is to say, displacement by translation of the door parallel to the plane P of the access opening, to one side or the other of the opening.

In fact, in the embodiment illustrated in the drawings, the door 6 translates downwardly for opening, but it may be displaced upwardly for opening if desired. In this case it is sufficient for the guideway 11 to be extended symmetrically to the other side of line III—III in FIG. 1, and member 12 to extend the guideway 17 symmetrically beyond the line III—III. The rack and pinion gear 14 must also be arranged to permit displacement of the slides 11 upwardly by provision, for example, of a pinion identical to pinion 15 symmetrically in the upper part of the door controlling device.

What is claimed is:

1. A device for controlling the opening and closing of a pressure-resistant door mounted on a frame for translation relative to the plane of an associated access opening, said door controlling device comprising planar slides provided on said door and disposed in planes parallel and perpendicular to said access opening plane, said slides having first guideways defined by slots, said slides being displaceable by translation in their planes parallel to said access opening plane, means for controlling the displacement of said slides, lateral guide members in parallel spaced relation on opposite sides of said door freely displaceable in said first guideways, second guideways receiving said lateral guide members, said second guideways being formed in two wall members fixed to said frame, facing and parallel to said slides, said first and second guideways having paths determined to constrain the movement of said guide members and thereby the panel of said door during displacement of said slides, such that for engagement and disengagement with the edge defining said access opening, said door panel being displaceable at right angles to said access opening and at a distance from said access opening edge, said door panel being displaceable by translation parallel to said access opening plane.

2. The door controlling device of claim 1, wherein said means for controlling the displacement of said slides comprises racks fixed to said slides and pinions meshing with said racks driven by drive means disposed laterally of said door.

3. The door controlling device of claim 1, wherein said guide members comprise rollers mounted on anti-friction bearings.

4. The door controlling device of claim 1, a seal member being interposed between said door panel and said access opening edge, wherein each of said first guideways comprises a first rectilinear part at right angles to said access opening plane and a second rectilinear part slightly inclined with respect to the longitudinal axis of the associated slide for effecting compression of said seal member trhough said door panel.

5. The door controlling device of claim 4, wherein said seal member comprises a gasket astraddle of said access opening orifice edge whereby said door panel is exposed or free of any seal.

6. The door controlling device of claim 4, wherein said second guideways on each side of said door comprise a first rectilinear portion parallel to said access opening plane and common with said second guideways on the same side of said door and aligned with the end of said first part of said first guideways, said second guideways further comprising second rectilinear portions at right angles to said access opening, and each of said second rectilinear portions having an end in alignment with the end of said second part of said first guideways and an angled intermediate rectilinear portion facilitating the transition between the displacement of said door at right angles to said access opening plane and the displacement of said door parallel to said access opening plane.

7. The door controlling device of claim 6, wherein bearing members are provided on said door on the side facing away from said seal member, said slides being slidable in said wall members and being interconnected by cross members, said cross members being in contact with said bearing members when said door panel is in engagement with said access opening edge, whereby said first guideways further comprise third rectilinear parts parallel to said access opening plane and extending said second parts of said first guideways.

8. The door controlling device of claim 7, wherein each of third rectilinear parts of said first guideways receiving the reaction force of said door has at its end remote from said second rectilinear part a slight recess so that the reaction force is transmitted to said frame through said bearing members and said cross members.

* * * * *